United States Patent [19]
Ulich et al.

[11] Patent Number: 5,287,165
[45] Date of Patent: Feb. 15, 1994

[54] HIGH SENSITIVITY-WIDE DYNAMIC RANGE OPTICAL TILT SENSOR

[75] Inventors: Bobby L. Ulich; Rudolph E. Radau, Jr., both of Tucson, Ariz.

[73] Assignee: Kaman Aerospace Corporation, Bloomfield, Conn.

[21] Appl. No.: 769,351

[22] Filed: Sep. 30, 1991

[51] Int. Cl.$^5$ ............................................. G01J 1/00
[52] U.S. Cl. ................................... 356/121; 250/201.9
[58] Field of Search ........................ 356/121; 250/201.9

[56] References Cited

U.S. PATENT DOCUMENTS

| 4,141,652 | 2/1979 | Feinleib | 356/121 |
| 4,725,138 | 2/1988 | Wirth et al. | 356/121 |
| 5,083,015 | 1/1992 | Witthoft et al. | 250/201.9 |

Primary Examiner—Richard A. Rosenberger
Assistant Examiner—K. P. Hantis
Attorney, Agent, or Firm—Fishman, Dionne & Cantor

[57] ABSTRACT

A new and improved adaptive optics wavefront tilt sensor having both very high sensitivity and wide dynamic range is presented. In accordance with this invention, distortion is induced in each subaperture beam by passing a high f-number beam through a field lens having large amounts of spherical aberration. The distortion provides transition from a wide dynamic range, low sensitivity wavefront tilt measurement to a narrow dynamic range, high sensitivity wavefront tilt measurement. This beam is then impinged on a single photodector which provides at least one electrical signal indicative of centroid position.

30 Claims, 4 Drawing Sheets

HIGH SENSITIVITY-WIDE DYNAMIC RANGE OPTICAL TILT SENSOR

BACKGROUND OF THE INVENTION

This generally to adaptive optics wavefront control systems. More particularly, this invention relates to a new and improved Hartman wavefront tilt sensor having both very high sensitivity and wide dynamic range.

Optical wavefront sensors known as Hartmann sensors are well known in the art. An example of a Hartmann wavefront sensor is described in U.S. Pat. No. 4,141,652. This type of sensor is composed of an array of wavefront gradient (tilt) sensors and a reconstructor. The tilt magnitudes in X and Y directions are measured in each of a number of subapertures which are contiguous with no appreciable gaps existing between subapertures. By a process of two dimensional numerical integration, the tilt measurements may be combined to reconstruct a wavefront phase map in which high spatial frequencies are missing because of the smoothing action of averaging tilt over the area of each subaperture.

Referring herein to prior art FIG. 1, the Hartmann wavefront sensor described in U.S. Pat. No. 4,141,652 is shown generally at 10. An input optical beam 12 is roughly collimated and falls upon a lenslet array 14. The lenslet array is a closely packed, two dimensional array of lenses 16. Each lens 16 focuses a portion of the input beam (i.e., a subaperture beam) onto a two-dimensional array of position sensitive detectors 18. The detector array 18 can be formed by suitably mounting individual quadrant cell trackers, one for each lenslet (subaperture), or by a monolithic array of photosensitive pixels, such as are available in charge injection devices (CID) or charge coupled device (CCD) detector arrays.

The intensity of light falling on one sub-unit or pixel of the detector array 18 is read out in the form of an electronic charge or current into a centroid computer 20. After reading out the electronic signals (proportional to the light impinging on each pixel) corresponding to all the pixels in the array of detectors 18 into the centroid computer 20, the centroid computer calculates (through either analog or digital computing) the first moment of the intensity distribution in both X and Y directions for each subaperture. This is the intensity centroid and, if the lenslet arrays have reasonably good optical quality, is proportional to the input wavefront tilt averaged over the subaperture area of each lenslet 16.

A wavefront reconstructor 22 receives the X and Y centroid Positions for each subaperture which, when multiplied by a suitable conversion factor, represents the subaperture wavefront tilts. Reconstructor 22 can be analog in operation, such as an array of resistors driven by current sources for each tilt measurement. In this case, the wavefront phases can be recovered at the array of points between the subapertures by measuring the voltages present at the nodes of the resistor array. Another implementation is a digital computer which performs the numerical integration of the tilts by matrix multiplication to produce an array of input phase estimates.

Referring herein to prior art FIG. 2, in a typical closed-loop system for controlling the adaptive optics control loops, an input optical beam 24 is reflected off a deformable mirror 26 whose shape is controlled by a plurality of piston actuators 28. The light beam is then passed through a high-quality beam splitter 30 with negligible optical aberrations. A first portion 32 of the light is reflected by beam splitter 30 to form the compensated output optical beam 32. A second portion 34 of the light reflected by the deformable mirror 26 is transmitted by the beam splitter 30 to the wavefront sensor 10 (FIG. 1). The reconstructed wavefront phase deviations from the desired (planar) shape serve as error signals to identical negative-feedback servo control loops, one for each phase measurement point and its corresponding piston actuator 28 in the deformable mirror assembly. Servo electronics 36 receive the wavefront phase error signals, process them by multiplication and normally by integration and frequency-dependent filtering to achieve high gain and freedom from undesirable oscillations. Servo electronics 36 also drives the actuators 28 in the direction to reduce the wavefront phase errors. It will be appreciated that under steady state conditions, the surface of the deformable mirror 26 is driven to the conjugate of the input beam wavefront shape so that upon reflection, the light is equiphase across the beam both going onto the wavefront sensor 10 and also at the beam control system output 32.

A disadvantage of the two-dimensional detector array 18 is the large number of pixels required to achieve a useful dynamic range of input wavefront deviations from the nominal shape, which is usually taken as planar. That is, at least three, and normally four pixels are required to measure the X and Y centroid coordinates for each subaperture (and therefore the subaperture wavefront tilt). If sufficient sensitivity could be achieved with this minimum number of pixels, then the detector could be read out quickly in series with a fast response time. This is necessary to achieve a large temporal bandwidth when the wavefront sensor is used as part of an adaptive optics wavefront control system. For large subaperture tilts the spots may also overlap or appear so far from their nominal positions that either it is impossible to tell which spot belongs to which subaperture (in the case of a CID/CCD array); or the spot misses the detector altogether and no centroid determination is possible. On the other hand, if a very large tilt dynamic range is achieved by, for example, using a lenslet with a very short focal length, then noise sources such as shot noise, dark current, nonlinearity, charge transfer inefficiency, quantization, etc. will limit the precision with which the centroid can be determined even near the null operating point. In this case, the closed-loop operation may be limited by the lack of sensitivity, with the result being that the output beam has wavefront deviations due to noise sources internal to the wavefront sensor which are clearly undesirable.

For the closed-loop beam control system, the large capture range and the high sensitivity required in the subaperture tilt sensor can be achieved in several ways. One method is to use a larger number of pixels, arranged so that the spot diameter is larger than one pixel. This allows centroid determination to a small fraction of a pixel size. Using many such pixels (for example, an 8×8 array) will allow a large dynamic capture range for each spot without confusion. However, this method inevitably results in a reduced temporal bandwidth since many more pixels must now be read out which takes a correspondingly longer time period. Alternatively, many fewer subapertures could be sensed in the same time, but again this is highly undesirable since higher spatial frequency information about the wavefront shape will be lost. Thus, one must give up either high temporal bandwidth or high spatial frequency information with this method if the readout rate of array detectors is assumed to be constant.

The prior art has addressed this problem with a coarse/fine gradient sensor described in U.S. Pat. No. 4,950,878, assigned to the assignee hereof and incorporated herein by reference. Referring herein to prior art FIG. 3, the coarse/fine gradient sensor described in U.S. Pat. No. 4,950,878 is shown generally at 38. An input optical beam 40 is subdivided into ray bundles for each subaperture 42 and is passed to a beam splitter 44. Upon reflection, part of the light is focused by lenslet 46 with focal length $f_c$ upon a photosensitive quadrant cell 48 producing electronic signals on a line 50 used by a centroid computer 52 to calculate the X and Y coarse centroid position and to provide an electrical signal indicative thereof on a line 53. The other part of the subaperture light beam passing through beam splitter 44 is focused by a lenslet 54 of focal length $f_f$ to produce a spot on a quadrant cell 56 producing electronic signals 58 used by a centroid computer 60 to calculate the X and Y fine centroid position and to provide an electrical signal indicative thereof on a line 62. A centroid selector 64 selects as its output on a line 66 the coarse centroid signal from line 53 when the radial coarse centroid error is above a threshold value P. The centroid selector 64 selects the fine centroid signal from line 62 as its output when the coarse centroid signal is below the radial threshold value P.

The focal length $f_f$ is chosen to be much longer than $f_c$ so that the linear motion of the light spot on the quadrant cell is much greater for the fine channel (54, 56) than for the coarse channel (46, 48) given the same subaperture tilt of the input subaperture 42. Thus, the fine channel will have higher sensitivity but smaller dynamic range than the coarse channel.

During operation, the coarse channel quadrant cell dimensions and focal length $f_c$ are selected to provide sufficient tilt dynamic range for unambiguous tilt measurement, even if the quadrant cells are close together for neighboring subapertures. In the limit, adjacent blocks of four (4) pixels in a CID/CCD array may be used for the coarse channel sensing, and either another part of the same monolithic chip detector array or a second detector array could be used for the fine sensors.

The minimum practical number of pixels required for each subaperture is 8 (4 for coarse and 4 for fine). If each (synthesized) quadrant cell can be read out with sufficient precision to achieve a resolution of one part in R of the capture (maximum) centroid range, then the combined coarse/fine ranges multiply to produce a combined ratio of dynamic range to resolution of $R^2$. In this case, the ratio of fine to coarse lenslet focal length is $f_f/f_c=R$. If each quadrant cell can be used to determine the centroid to B binary bits of precision (where B is approximately equal to $\log_2 R$), then the coarse/fine combination has a precision of 2B binary bits $[=\log_2(R^2)]$. This is a much more efficient usage of pixels than can be achieved by grouping more than four into a single centroid sensor. For instance, with 8 pixels rather than 4, dynamic range is only increased in each dimension by roughly $(8/4)^{\frac{1}{2}}=(2)^{\frac{1}{2}}$. Thus, increasing the number of pixels used in a single centroid sensor only increases the relative precision by the square root of the ratio of the numbers of pixels. By creating new centroid sensors, the improvement in relative precision is much greater if successively greater sensitivities are used for each centroid sensor.

As mentioned, a longer focal length lenslet may be used to increase the sensitivity of the fine sensor. This could be accomplished in other ways such as using a smaller diameter pixel sensor and a correspondingly smaller beamlet spot size.

The minimum spot size S for a collimated input beam generated by a distant point source is $$S=2.44\lambda f/d$$

where $\lambda$ is the wavelength, d is the lenslet aperture, and f is the lenslet focal length. For spatially extended sources of the input beam, it may be desirable to spatially place the photosensitive detector away from the lens focus so as to produce a larger, defocused spot. By doing this, the size of the spot depends less on the angular size of the light source and therefore, the calibration of the centroid detector will suffer smaller errors due to variable source size.

While the coarse/fine gradient sensor of U.S. Pat. No. 4,950,878 provides a significant improvement in sensitivity and dynamic range over the prior art, a need exists to simplify such adaptive optics wavefront control systems.

Summary of the Invention

The above-discussed and other problems and deficiencies of the prior art are overcome or alleviated by the high sensitivity-wide dynamic range optical tilt sensor of the present invention. In accordance with the present invention, an optical input beam, in which wavefront control is desired, is divided into an array of subaperture beams. Distortion is induced in each subaperture beam by passing a high f-number beam through a field lens having large amounts of spherical aberration. The distortion provides transition from a wide dynamic range, low sensitivity wavefront tilt measurement to a narrow dynamic range, high sensitivity wavefront tilt measurement. This beam is then impinged on a single photodector which provides at least one electrical signal indicative of centroid position. These signals may be used to drive a deformable mirror employed to correct wavefront tilts in the input beam.

The present invention provides a wide dynamic range measurement (i.e., coarse) and a high sensitivity measurement (i.e., fine) with a single photodetector device. The present invention differs from the prior art of U.S. Pat. No. 4,950,878 wherein a beam splitter was required to split and redirect the input beam to separate coarse and fine wavefront tilt sensors. The present invention maximizes wavefront tilt measurement accuracy without sacrificing dynamic range by maximizing the energy throughput to the photodetector.

The above-discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 4:
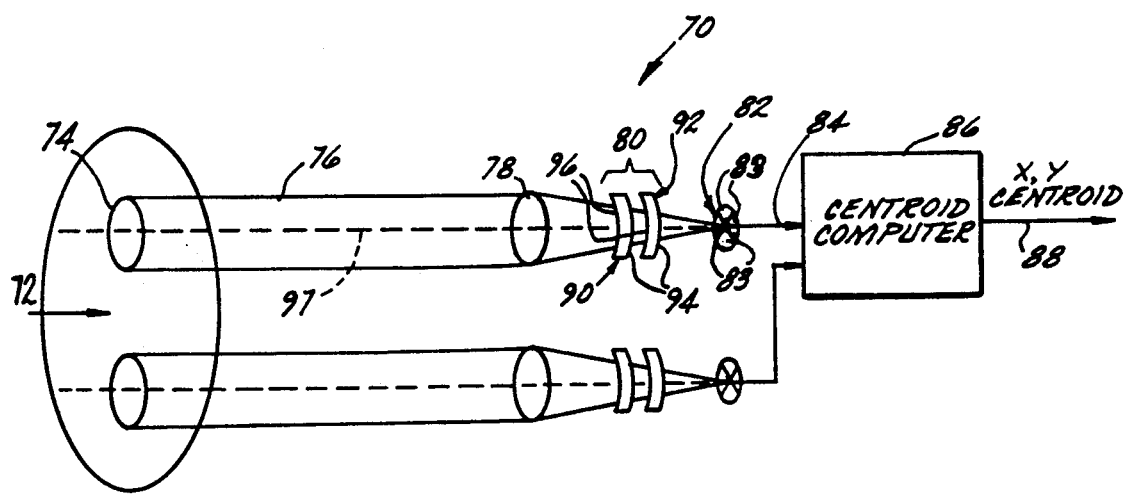
FIG. 4 is a schematic view of one subaperture component of a high sensitivity-wide dynamic range optical tilt sensor scheme in accordance with a first embodiment of the present invention.

Referring to FIG. 4, in accordance with a preferred embodiment of the present invention, a high sensitivity-wide dynamic range optical tilt sensor is shown generally at 70. In accordance with the present invention, an input optical beam 72 is sub divided into ray bundles for each subaperture 74. A subaperture beam 76 from sub-aperture 74 is imaged on a lenslet 78. Beam 76 then impinges on field optic means 80 generating distortion aberrations in beam 76 which is focused onto a photosensitive quadrant cell 82 (or quadrant photodetector). Photodetector 82 is shown as a circular quadrant array comprising four photodetector elements 83, one in each quadrant, with each photodetector element 83 converting photo energy from light beam 76 into electrical energy (i.e., electrical signals, one for each quadrant cell). These signals are presented on a line 84 to a centroid computer 86 for calculation of centroid position (i.e., spot position) for both the X and Y directions. It will be appreciated that subaperture 74 is only one of an array of apertures employed to detect an entire wavefront in the X and Y directions. Further, the output of computer 86 on a line 88 may be used to control a deformable mirror for correcting aberrations (i.e., tilts) in the wavefront. The deformable mirror generally comprises a plurality of electronically controlled actuators driving an array of glass or metal elements forming a face sheet, as described hereinbefore.

Field optic means 80 of the first embodiment (FIG. 4), comprises a pair of meniscus field lenses 90 and 92 (i.e., concavo-convex lenses). Lenses 90 and 92 each have a convex surface 94 and a concave surface 96. Optics 80 provides transition from a wide dynamic range, low sensitivity wavefront tilt measurement to a narrow dynamic range, high sensitivity wavefront tilt measurement. The present invention provides coarse/fine detection with a single photodetector 82 and eliminates the need for the beam splitter and the second photodetector as hereinbefore described in the prior art (i.e., U.S. Pat. No. 4,950,878).

Although photodetector 82 is described as a quadrant detector, other position sensing detectors may be employed without departing from the spirit or scope of the present invention (e.g., lateral position detectors, CCD's, etc).

Lenses 90 and 92 employ spherical field optics to introduce a desired amount of distortion by producing large amounts of spherical aberration. Spherical aberration arises from the fact that rays of beam 76 are initially at different distances from the optical axis 97 and come to a focus at different distances along axis 97 when they are refracted by lenses 90 and 92. The spherical aberration is preferably forth order or higher. The amount of image blur, due to this aberration, is small due to the high f-number of optics 78. Since the chief ray height of beam 76 is significantly larger than the marginal ray height at lenses 90 and 92, a large amount of distortion is produced. Therefore, for a large wavefront tilt, the spot on detector 82 will be large, preferably large enough to fill all quadrants of photodetector 82, and at the null point (i.e., where there is no tilt in the wavefront), the spot will be small. The larger wavefront tilts have a larger spot resulting in a wide dynamic range, however with low sensitivity. At or near the null point, the spot is small thus providing high sensitivity but a narrow dynamic range. The change in spot size and position is a non-linear function of the tilt at this portion of the wavefront (i.e., subaperture beam 76). A tilt in the wavefront results in shifting the spot off center and the larger the tilt the greater the shift. This is detected by photodetector 82 whereby different amounts of photo energy is impinged on each of the quadrant cells (due to the shift) producing different levels of electrical signals on line 84 to computer 86 for determining the amount of adjustment required. At the null point, the small spot will be located in the center of photodetector 82. Moreover, an equal portion of the spot will lie in each quadrant of photodetector 82 thereby producing equal electrical signals from each quadrant indicating that the wavefront does not require adjustment. A large tilt in the wavefront will produce a non-linear monotonically increasing spot motion and increasing spot size on photodetector 82, resulting in spot motion compression. This spot motion becomes linear and highly sensitive to tilt as the spot approaches optical axis 97. This corresponds to a large dynamic range and low sensitivity for the large tilt which is followed by a reducing dynamic range and increasing sensitivity as the amount of tilt is reduced.

Figure 1:
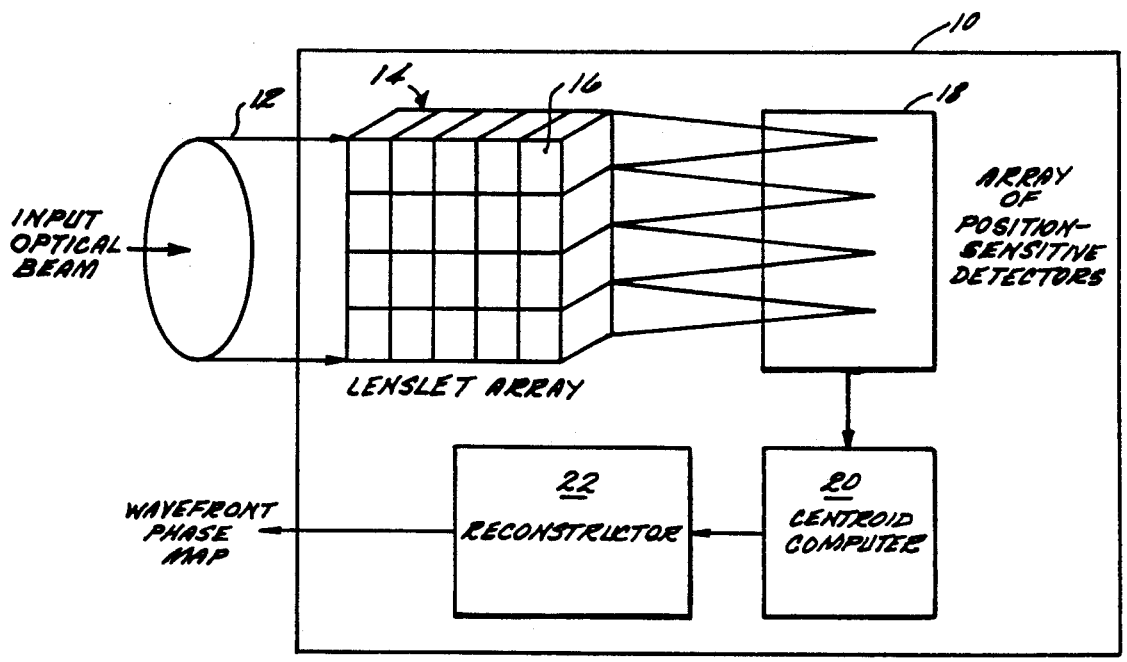
FIG. 1 is a schematic view of a prior art Hartmann wavefront sensor taken from FIG. 1 of U.S. Pat. No. 4,950,878.
Figure 2:
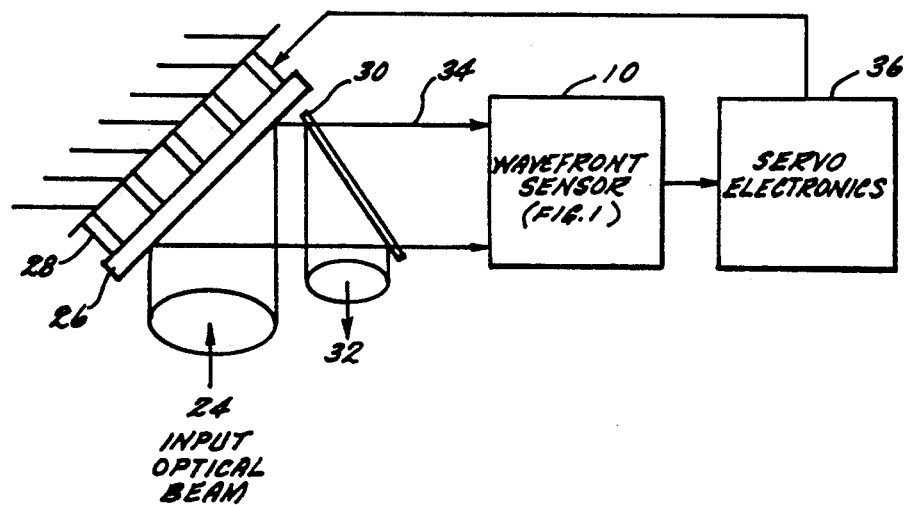
FIG. 2 is a schematic view of a prior art adaptive optics wavefront control sensor taken from FIG. 2 of U.S. Pat. No. 4,950,878.
Figure 3:
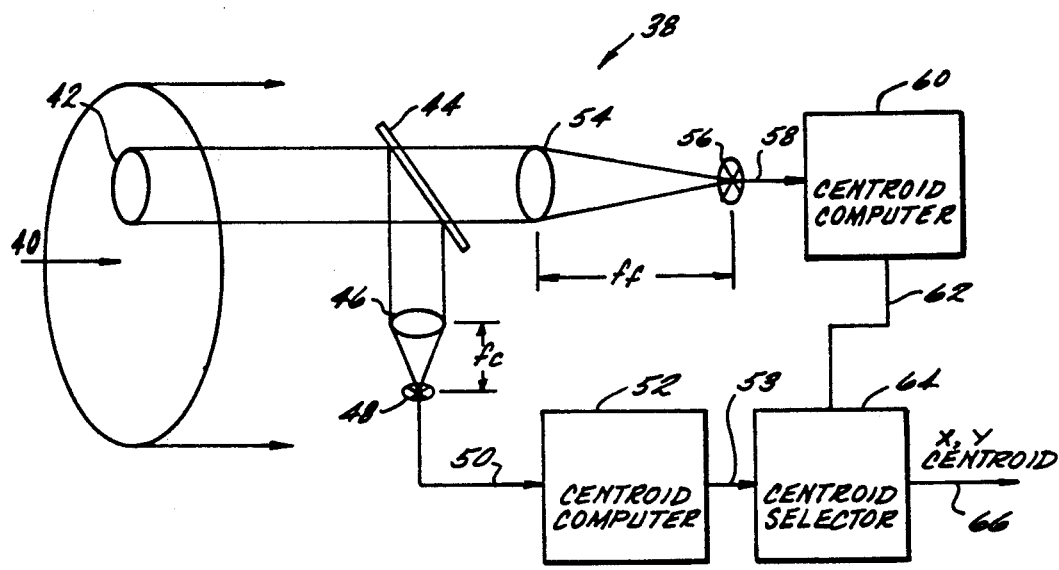
FIG. 3 is a schematic view of one subaperture component of a prior art coarse/fine gradient sensor taken from FIG. 3 of U.S. Pat. No. 4,950,878.
Figure 5:
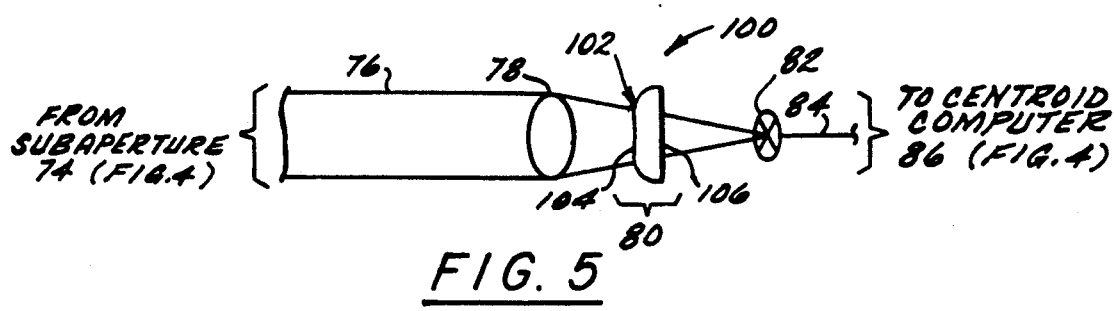
FIG. 5 is a schematic view of one subaperture component of the high sensitivity-wide dynamic range optical tilt sensor scheme in accordance with a second embodiment of the present invention.

Referring now to FIG. 5, in a second embodiment of the invention, wherein like elements to the first embodiment are numbered alike, an optical tilt sensor 100 is shown. Sensor 100 is essentially the same as sensor 70 (FIG. 1) with the exception of the field optic means 80. Optic means 80 of the second embodiment comprises a plastic aspheric field lens 102 having aspheric surfaces 104 and 106. It will be appreciated that lens 102 is best suited for mass produced lens set optics. Lens 102 can be produced relatively easily and inexpensively once an aspheric mold is produced. Spherical aberration is produced by the asphericity of lens 102 and may be adjusted by varying the asphericity of surface 106 to produce the desired distortion aberration. The principle of operation is the same as that as described for lenses 90 and 92 of the first embodiment.

Figure 6:
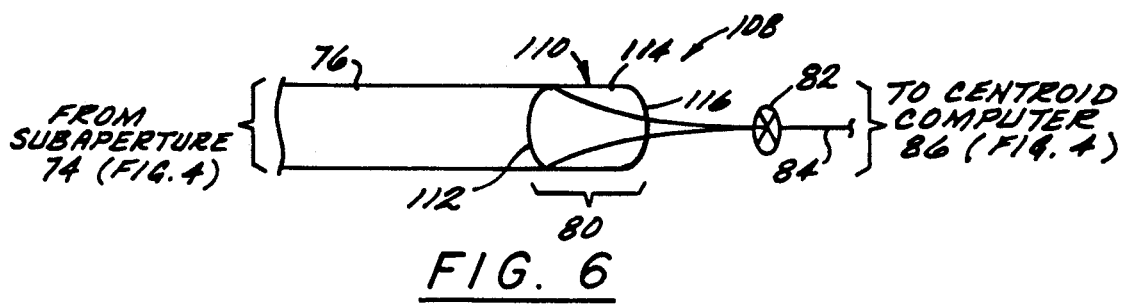
FIG. 6 is a schematic view of one subaperture component of the high sensitivity-wide dynamic range optical tilt sensor scheme in accordance with a third embodiment of the present invention.
Figure 7:
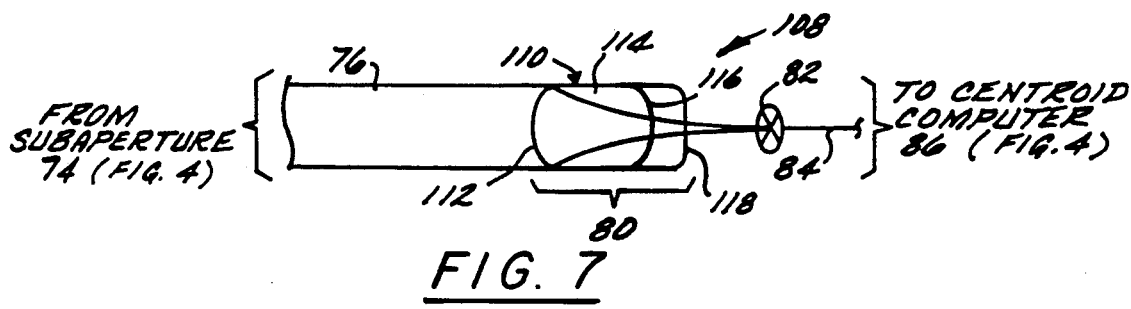
FIG. 7 is a schematic view of one subaperture component of the high sensitivity-wide dynamic range optical tilt sensor scheme in accordance with a fourth embodiment of the present invention.

Referring now to FIG. 6, a third embodiment of the present invention wherein an optical tilt sensor 108 is shown. Sensor 108 is generally the same as sensor 70 (FIG. 1) with the exception of lenslet 78 and field optic means 80. Lenslet 78 (FIG. 1) has been incorporated into field optic means 80. Optics 80 comprises a gradient index lenslet 110. Lenslet 110 has a positive power front surface 112 which is disposed on a negative power gradient index lens 114. The distortion is produced by the spherical aberration of a rear surface 116 wherein the chief ray height is several times that of the marginal ray. Reference now being made to FIG. 7, for this reason it is preferred that an aspheric plastic rear lens 118 (which is of the same lens type as lens 102 in FIG. 5) be cemented onto surface 116 of the gradient index lenslet 110. This produces an enhanced control of the spherical aberration as compared to that of the first embodiment.

Figure 8:
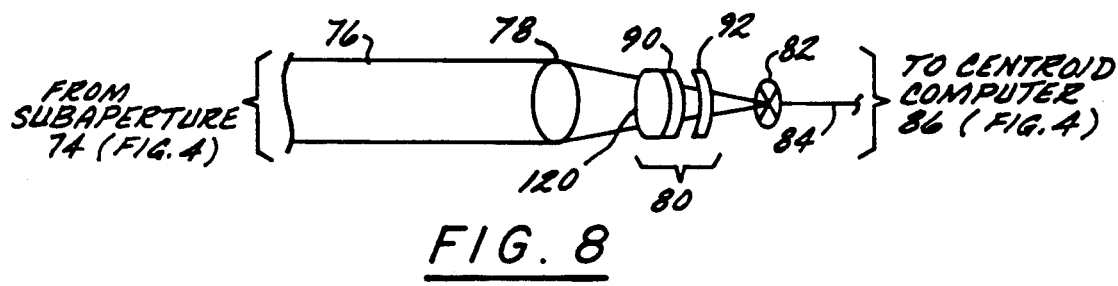
FIG. 8 is a schematic view of one subaperture component of the high sensitivity-wide dynamic range optical tilt sensor scheme in accordance with a fifth embodiment of the present invention.

An aspheric lens 120 (FIG. 8), also the same type of lens as lens 102 (FIG. 5), can be added to lens 90 (FIG. 1) of the first embodiment to further enhance the spherical aberration affect of sensor scheme 70 (i.e., the first embodiment), thus providing a greater dynamic range.

In order to improve sensitivity throughout the dynamic range, the field optic means 80 shown in FIGS. 4-8 may be comprised of a selected optical glass which has desired chromatic aberration characteristics (i.e., lateral color and chromatic variation in distortion). The image size on photodetectors 82 can be varied through the control of lateral color and chromatic variation in distortion as an increasing function of wavefront tilt in order to keep the image spot on all four of the photodetector quadrants, thus making the image centroid position measurable. The chromatic aberration is the result of the index of refraction for optics 80 varying with wavelength, thus bringing different colors of the light to focus at different points along the optical axis. These chromatic aberrations are adjustable in conjunction with the monochromatic distortion and the spectral response (i.e., response to monochromatic light as a function of wavelength) of photodetector 82 to obtain a monotonically increasing image centroid position with wavefront tilt. In other words, photodetector 82 is more sensitive to certain light frequencies than others. Thus, as the wavefront tilt is decreased the monochromatic distortions are reduced as the spectral response of the photodetector 82 is approached. This will result in a greater output from photodetector 82 since the photoactive surfaces of photodetector 82 are more sensitive to light and at this wavelength, a correspondingly greater electrical output will be produced.

The present invention is best suited for quadrant photodetector devices as described herein. This is due to the fact that other photodetector devices such as CCD arrays require sharp subaperture images for accurate centroid measurement. This method requires the lenslets chromatic and monochromatic aberrations excluding distortion to be minimized at distortion control to produce the desired image motion (i.e., spot distortion).

Figure 9:
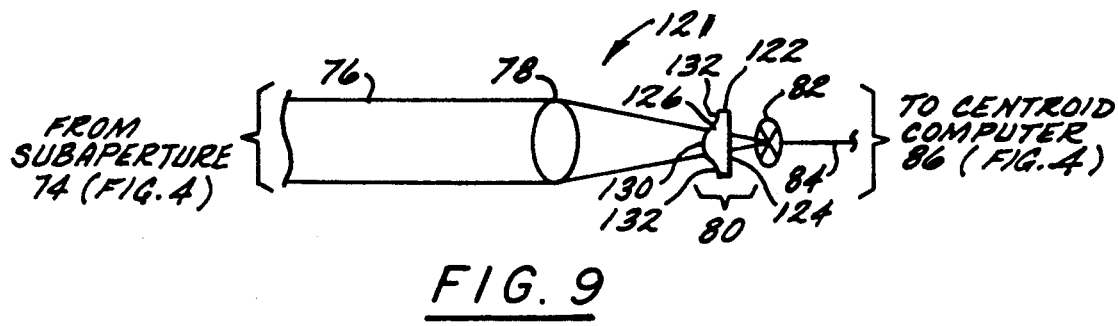
FIG. 9 is a schematic view of one subaperture component of the high sensitivity-wide dynamic range optical tilt sensor scheme in accordance with a sixth embodiment of the present invention.

Referring now to FIG. 9, in still another embodiment of the present invention a high sensitivity-wide dynamic range optical tilt sensor is shown generally at 121. Optical tilt sensor 121 comprises essentially the same elements as sensor 70 (FIG. 1) with the exception of the field optic means 80. Optics 80 comprises an aspheric field lens 122 having a flat surface 124 opposed by an aspheric surface 126 (i.e., a generally convex surface). Surface 126 comprises an extremely convex central portion 130 and a generally flat outer portion 132. Further, the lens must be disposed relatively close to photodetector 82. The focal length of the lens increases radically with distance from the central axis of the lens to the side. A beam focused near the lenslet's optical axis produces a small focused spot near the center of the position detector. As beam 76 deviates from the lenslet's optical axis, the spot grows in size (the spot is out of focus on the photodetector 82) thereby allowing a portion of the spot to always remain on each side of the center of the photodetector null point (or in all four quadrants of photodetector 82). This method of operation allows the sensitivity of the tilt sensor to be lower for large tilt errors due to the large spot size on photodetector 82 while for small tilt errors, high tilt sensitivity is achieved due to the small spot on photodetector 82. The rate of change from a large spot to a small spot is significantly greater than lenses 90 and 92 (FIG. 1) due to surface 126.

Figure 10A:
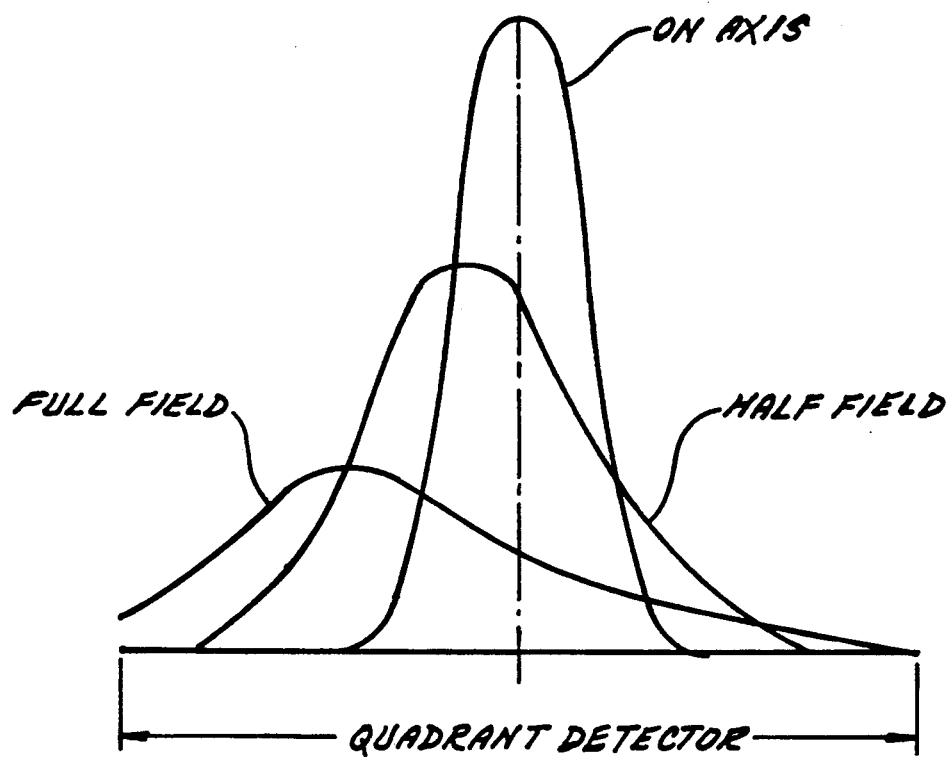
FIG. 10A is a chart illustrating spot intensity as a function of input wavefront tilt angle for the sensor scheme of FIG. 9.
Figure 10B:
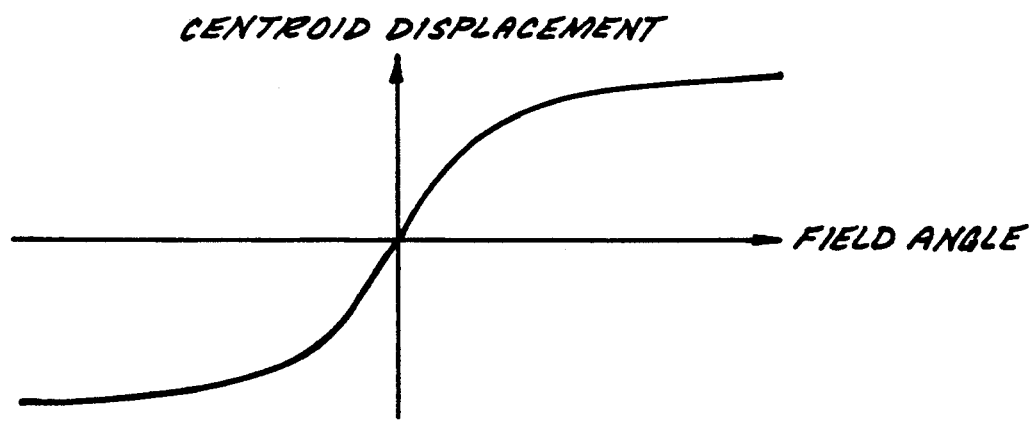
FIG. 10B is a chart illustrating centroid position versus input wavefront tilt angle for the sensor scheme of FIG. 9.

FIG. 10A shows image spot intensity profiles as a function of input wavefront tilt angle for optical tilt sensor 121 (FIG. 9). FIG. 10B shows the centroid positions versus input wavefront tilt angle for sensor 121. It will be noted that the nonlinear response which provides wide dynamic range while retaining high sensitivity is near zero tilt.

Prior art techniques have not incorporated distortion producing field optics (i.e., field optic means 80) for extending the sensors dynamic range. Further, the light loss in the present invention is nearly equal to that of the prior art linear Hartmann wavefront sensor and significantly less than that of other prior art sensors with compatible dynamic range and tilt sensitivity. It will be appreciated that the optical performance can be optimized for the particular type of photodetector device employed.

While preferred embodiments have been shown and described, various modifications and substitutions may be made thereto without departing from the spirit and scope of the invention. Accordingly, it is to be understood that the present invention has been described by way of illustration and not by limitations.

What is claimed is:

1. A wavefront sensor having improved sensitivity and dynamic range, comprising:
   subaperture means for dividing an optical input beam into a plurality of subaperture beams;
   lenslet means for focusing one of said subaperture beams and for providing a converging subaperture beam and a resulting image spot;
   field optic means for inducing an aberration in said converging subaperture beam, said field optic means having a pair of opposed optical surfaces, one of which receives said converging subaperture beam, said aberration and position of said image spot being dependent on wavefront tilt of said subaperture beam, said field optic means providing an aberrated subaperture beam; and
   detector means for converting photon energy from said aberrated subaperture beam impinged thereon into one or more electrical signals indicative of centroid position.

2. The sensor of claim 1 further including:
centroid computer means receptive to said electronic signals for calculating centroid position, said centroid computer means having an output indicative of said calculated centroid position, said output being adapted to drive an input of a deformable mirror.

3. The sensor of claim 1 wherein said aberration comprises fourth and higher order distortion aberration thereby producing nonlinear image spot motion.

4. The sensor of claim 3 wherein said aberration comprises fourth and higher order spherical aberration thereby producing nonlinear image spot motion.

5. The sensor of claim 4 wherein said field optic means comprises:
spherical optical lens means for producing said spherical aberration.

6. The sensor of claim 5 wherein said spherical optic lens means comprises at least one concavo-convex lens.

7. The sensor of claim 6 wherein said spherical optic lens means further comprises:
an aspheric lens disposed on one surface of said concavo-convex lens.

8. The sensor of claim 5 wherein said spherical optic lens means comprises an aspheric lens.

9. The sensor of claim 8 wherein said aspheric lens comprises an optical grade plastic.

10. The sensor of claim 5 wherein said spherical optic lens means comprises a gradient index lenslet.

11. The sensor of claim 10 wherein said gradient index lenslet comprises:
a negative gradient index lens having a pair of opposed optical surfaces;
a positive power optical surface disposed on a first one of said surfaces of said negative gradient index lens; and
a spherical aberration optical surface disposed on a second one of said surfaces of said negative gradient index lens.

12. The sensor of claim 11 wherein said spherical optic lens means further comprises:
an aspheric lens disposed on said spherical aberration optical surface.

13. The sensor of claim 5 wherein said spherical optic lens means comprises:
a pair of opposed optical surface, a first surface being generally convex and a second surface being generally flat, said first surface having an extremely convex central portion and a relatively flat outer portion.

14. The sensor of claim 5 wherein said aberration further comprises chromatic aberration.

15. The sensor of claim 14 wherein said spherical optic lens means comprises optical glass having characteristics for producing said chromatic aberration.

16. The sensor of claim 1 wherein said detector means comprises:
a quad cell photodetector having four identical Photodetector cells, one of said cells disposed in each quadrant.

17. A wavefront sensing method having improved sensitivity and dynamic range, comprising the steps of:
dividing an optical input beam into a plurality of subaperture beams;
focusing one of said subaperture beams to provide a converging subaperture beam;
inducing an aberration in said converging subaperture beam to provide a aberrated subaperture beam, said aberration being dependent on wavefront tilt of said subaperture beam; and
converting photo energy from said aberrated subaperture beam into one or more electrical signals indicative of centroid position.

18. The method of claim 17 further comprises:
calculating centroid position from said electrical signal to provide an output signal indicative of centroid position; and
driving an input of a deformable mirror with said output.

19. The method of claim 17 wherein said aberration comprises distortion aberration.

20. The method of claim 17 wherein said aberration comprises spherical aberration.

21. The method of claim 20 wherein said spherical aberration is produced by a spherical optic lens.

22. The method of claim 21 wherein said spherical optic lens comprises at least one concavo-convex lens.

23. The method of claim 22 wherein said spherical optic lens further comprises:
an aspheric lens disposed on one surface of said concavo-convex lens.

24. The method of claim 21 wherein said spherical optic lens comprises an aspheric lens.

25. The method of claim 21 wherein said spherical optic lens comprises a gradient index lenslet.

26. The method of claim 25 wherein said gradient index lenslet comprises:
a negative gradient index lens having a pair of opposed optical surfaces;
a positive power optical surface disposed on a first one of said surfaces of said negative gradient index lens; and
a spherical aberration optical surface disposed on a second one of said surfaces of said negative gradient index lens.

27. The method of claim 26 wherein said spherical optic lens further comprises:
an aspheric lens disposed on said spherical aberration optical surface.

28. The method of claim 21 wherein said spherical optic lens comprises:
a pair of opposed optical surface, a first surface being generally convex and a second surface being generally flat, said first surface having an extremely convex central portion and a relatively flat outer portion.

29. The method of claim 21 wherein said aberration further comprises chromatic aberration.

30. The method of claim 29 wherein said spherical optic lens comprises optical glass having characteristics for producing said chromatic aberration.

* * * * *